(12) United States Patent
Chapman

(10) Patent No.: US 12,102,077 B2
(45) Date of Patent: Oct. 1, 2024

(54) ICE FISHING KNEE BOARD

(71) Applicant: Collin M. Chapman, Random Lake, WI (US)

(72) Inventor: Collin M. Chapman, Random Lake, WI (US)

( * ) Notice: Subject to any disclaimer, the term of this patent is extended or adjusted under 35 U.S.C. 154(b) by 443 days.

(21) Appl. No.: 17/443,267

(22) Filed: Jul. 23, 2021

(65) Prior Publication Data

US 2023/0023586 A1    Jan. 26, 2023

(51) Int. Cl.
*A01K 97/22* (2006.01)
*A01K 97/01* (2006.01)
*A01K 97/06* (2006.01)
*A01K 97/10* (2006.01)

(52) U.S. Cl.
CPC .............. *A01K 97/22* (2013.01); *A01K 97/01* (2013.01); *A01K 97/06* (2013.01); *A01K 97/10* (2013.01)

(58) Field of Classification Search
CPC ........ A01K 97/01; A01K 97/06; A01K 97/10; A01K 97/22; A47G 23/0208; A47G 23/0241
USPC ............. 43/54.1, 21.2; 206/315.11; 224/920, 224/922; 2/24; 297/423.1, 423.11
See application file for complete search history.

(56) References Cited

U.S. PATENT DOCUMENTS

| | | | | |
|---|---|---|---|---|
| 2,153,549 | A * | 4/1939 | Cooper | A01K 97/06 220/521 |
| 2,264,744 | A * | 12/1941 | Dunnam | A01K 97/22 297/188.13 |
| 2,493,084 | A * | 1/1950 | Pharo | A47C 4/14 297/135 |
| 2,555,073 | A * | 5/1951 | Zdankoski | A01K 97/22 294/143 |
| 2,681,809 | A * | 6/1954 | Hamill | A01K 97/22 297/188.1 |
| 3,206,266 | A * | 9/1965 | Holloway | A01K 97/06 312/301 |
| 3,603,019 | A * | 9/1971 | Smeltzer | A01K 97/10 43/56 |
| 3,780,468 | A * | 12/1973 | Maffett | A01K 97/06 43/54.1 |
| 4,103,965 | A * | 8/1978 | Engman | A01K 97/06 297/52 |
| 4,191,420 | A * | 3/1980 | Fassett | A01K 97/22 297/183.5 |
| 4,353,182 | A * | 10/1982 | Junkas | A01K 97/22 206/315.11 |
| 4,428,617 | A * | 1/1984 | Lawson | A01K 97/10 297/188.2 |

(Continued)

FOREIGN PATENT DOCUMENTS

DE    202017101206 U1    7/2017

*Primary Examiner* — Timothy D Collins
*Assistant Examiner* — Maria E Graber
(74) *Attorney, Agent, or Firm* — Ziolkowski Patent Solutions Group, SC

(57) ABSTRACT

An ice fishing knee board includes a base board having an equipment section at a front of the base board and a kneeling section at a rear of the base board and adjacent to the equipment section. The equipment section may include a variety of different compartments for various pieces of ice fishing equipment or supplies. In addition, the ice fishing knee board includes a knee pad positioned in the kneeling section of the base board.

20 Claims, 5 Drawing Sheets

(56) References Cited

U.S. PATENT DOCUMENTS

| | | | | |
|---|---|---|---|---|
| 4,541,539 A * | 9/1985 | Matthews | A01K 97/22 | 220/555 |
| 4,730,569 A * | 3/1988 | Colson | B62B 15/00 | 280/28.12 |
| 4,841,661 A * | 6/1989 | Moore | A01K 97/06 | 222/130 |
| 4,845,881 A * | 7/1989 | Ward | A01K 97/22 | 43/21.2 |
| D313,061 S * | 12/1990 | Bascom | D22/199 | |
| 5,100,198 A * | 3/1992 | Baltzell | A47C 7/74 | 280/47.38 |
| 5,120,016 A * | 6/1992 | Dysarz | A01K 97/10 | 248/539 |
| 5,127,181 A * | 7/1992 | Teixeira | A01K 97/10 | 297/188.2 |
| 5,163,694 A * | 11/1992 | Reichek | A01K 97/06 | 280/79.2 |
| D338,333 S * | 8/1993 | Walker | 5/639 | |
| 5,251,921 A * | 10/1993 | Daniels | B62B 13/00 | 220/523 |
| 5,259,215 A * | 11/1993 | Rocca | A45C 5/143 | 280/30 |
| 5,471,779 A * | 12/1995 | Downey | A01K 97/22 | 206/315.11 |
| 5,575,490 A * | 11/1996 | Simpson, Jr. | A01K 97/01 | 280/28.15 |
| D378,456 S * | 3/1997 | Speicher | D34/24 | |
| 5,692,335 A * | 12/1997 | Magnuson | A01K 97/22 | 297/188.1 |
| 5,823,337 A * | 10/1998 | Yunger | A01K 97/06 | 206/315.11 |
| 6,014,833 A * | 1/2000 | Benavidez | A01K 97/06 | 206/315.11 |
| 6,052,939 A * | 4/2000 | McClain | A01K 97/22 | 206/315.11 |
| 6,269,587 B1 * | 8/2001 | Wallace | A01K 97/20 | 206/315.11 |
| 6,435,614 B1 * | 8/2002 | Gollahon | A01K 97/10 | 297/440.16 |
| 7,155,859 B1 * | 1/2007 | Brooks | A01K 97/06 | 206/315.11 |
| 7,384,051 B1 * | 6/2008 | Haire | B62B 3/10 | 280/47.35 |
| 7,415,794 B1 * | 8/2008 | Thompson | A01K 97/22 | 206/315.11 |
| 7,997,024 B2 * | 8/2011 | Gesik | A01K 97/06 | 43/57.1 |
| D646,528 S * | 10/2011 | Stallman | D7/605 | |
| 8,052,020 B1 * | 11/2011 | Wurtz | A01K 97/22 | 224/676 |
| 9,297,568 B1 * | 3/2016 | Thompson | A45C 11/00 | |
| 9,591,924 B1 * | 3/2017 | O'Neal | A47C 7/664 | |
| 10,015,955 B2 * | 7/2018 | Camp, Jr. | A01K 97/04 | |
| 10,272,976 B1 | 4/2019 | Newhall et al. | | |
| 10,278,507 B1 * | 5/2019 | Nowack | A01K 97/22 | |
| 10,405,531 B1 * | 9/2019 | Denmark | A01K 97/04 | |
| 10,568,312 B2 * | 2/2020 | McPherson | B65D 81/3216 | |
| 10,791,725 B2 * | 10/2020 | Castillo | A01K 97/06 | |
| D924,598 S * | 7/2021 | Cohen | D6/601 | |
| D951,677 S * | 5/2022 | Cohen | D6/601 | |
| D958,554 S * | 7/2022 | Matheson | D6/601 | |
| 2002/0096811 A1 * | 7/2002 | Callsen | F16F 9/306 | 267/143 |
| 2004/0245817 A1 * | 12/2004 | Kleckner | A01K 97/01 | 297/217.7 |
| 2005/0126064 A1 * | 6/2005 | Winkler | A01K 97/10 | 43/21.2 |
| 2007/0000005 A1 * | 1/2007 | Wang | A41D 13/065 | 2/24 |
| 2007/0283614 A1 * | 12/2007 | Kessler | A01K 97/10 | 43/21.2 |
| 2010/0050908 A1 * | 3/2010 | Moore, Jr. | A01K 97/22 | 108/33 |
| 2011/0154852 A1 * | 6/2011 | Cavazos | F25D 3/06 | 62/457.7 |
| 2011/0239525 A1 * | 10/2011 | Morales | A01K 97/06 | 43/54.1 |
| 2012/0007391 A1 * | 1/2012 | McCaslin | A01K 97/22 | 297/183.1 |
| 2014/0033600 A1 * | 2/2014 | McCorkle | A01K 97/10 | 43/21.2 |
| 2015/0223585 A1 * | 8/2015 | Worrell | A45F 4/06 | 220/23.8 |
| 2016/0021861 A1 * | 1/2016 | Pippins | A01K 99/00 | 43/17.5 |
| 2017/0245486 A1 * | 8/2017 | Larson | B65D 51/24 | |
| 2018/0007884 A1 * | 1/2018 | Langley | B65D 43/12 | |
| 2019/0387728 A1 * | 12/2019 | Constantine | A01K 97/06 | |

\* cited by examiner

ICE FISHING KNEE BOARD

BACKGROUND OF THE INVENTION

Embodiments of the present invention relate to knee boards and, more particularly, to knee boards for ice fishing.

When individuals desire to go ice fishing, they must bring their ice fishing equipment to an appropriate location—typically a frozen lake—with ice that is thick enough to hold their weight and the weight of their equipment, shanties, and/or vehicles. Ice fishing requires many different types of equipment. To begin, ice fishers generally use an auger or drill to cut a hole in the ice. The hole will typically be between 8 and 10 inches. A hole of that size will allow a fish to fit therethrough, but will not allow a person to fall into the water.

After cutting the hole in the ice, ice fishers will remove remaining chunks of ice with an ice skimmer in order to ensure that the hole is free from ice that may interfere with the ice fishing equipment or fool them into believing they have caught a fish. Once the hole is at least mostly free from ice, ice fishers will set up their fishing rods. While an ice fisher may use a standard summer fishing rod, many ice fishers will use a rod designed for ice fishing. The length of an ice fishing rod, which is usually between two and four feet, is much shorter than that of a summer fishing rod because ice fishing does not require casting. Ice fishers may set up their fishing rods with a hook, lure, jig, and/or bait, as necessary, and drop the fishing line into the water. They may elect to keep their hooks, lure, and jigs in a tackle box and their bait in a bait puck or other container that may be stored inside or outside of the tackle box.

Since it can take quite a bit of time before a fish takes the bait, ice fishers will not typically want to hold their fishing rods the entire time they are fishing. While they could simply place their fishing rods on the ice/snow, they run the risk of their rods falling or being dragged into the water. Thus, ice fishers may place their fishing rods in holders that keep them upright at an angle with respect to the ice. They may also use ice fishing tip-ups that utilize a trigger mechanism that flips up or releases a flag, alerting the ice fishers that they have a bite on their line. The ice fishers can then take the necessary actions required to complete the catch.

The variety of different equipment and the environment required for ice fishing can pose some problems for ice fishers. Initially, since ice fishing takes place on ice/snow, ice fishers kneeling on the ice may get wet and cold, even if they are wearing the appropriate gear for the conditions. Further, even if they are wearing appropriate gear, they may become uncomfortable kneeling on the hard ice. In addition, the slippery surface of the ice makes it more likely that their equipment will fall through the hole and into the water. That is, when ice fishers are setting up their hooks, lures, jigs, and/or bait, they may put the equipment and/or bait puck onto the ice and accidentally drop or push it into the hole in the ice.

It would therefore be desirable to provide an apparatus that can make ice fishing more comfortable and convenient for ice fishers.

BRIEF STATEMENT OF THE INVENTION

In accordance with one aspect of the invention, an ice fishing knee board includes a base board having an equipment section at a front of the base board and a kneeling section at a rear of the base board and adjacent to the equipment section. The equipment section includes a fishing rod holder sized to receive a fishing rod handle and a first tackle box. In addition, the ice fishing knee board includes a knee pad positioned in the kneeling section of the base board.

In accordance with another aspect of the invention, a kit for an ice fishing knee board includes a knee pad and a base board. The base board includes a kneeling section positioned at a rear of the base board and sized to receive the knee pad. The base board also includes an equipment section positioned at a front of the base board and adjacent to the kneeling section. The equipment section includes a fishing rod holder and a tackle box.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the present invention provide for an ice fishing knee board. The ice fishing knee board includes a kneeling section including a pad on which ice fishers can kneel while ice fishing. The ice fishing knee board further includes an equipment section having a plurality of compartments for holding or storing equipment. As non-limiting examples, the ice fishing knee board may include a fishing rod holder, a tool holder, at least one tackle box, a cup holder, and a bait puck holder. The ice fishing knee board may also optionally include at least one handle for carrying the ice fishing knee board.

Figure 1:
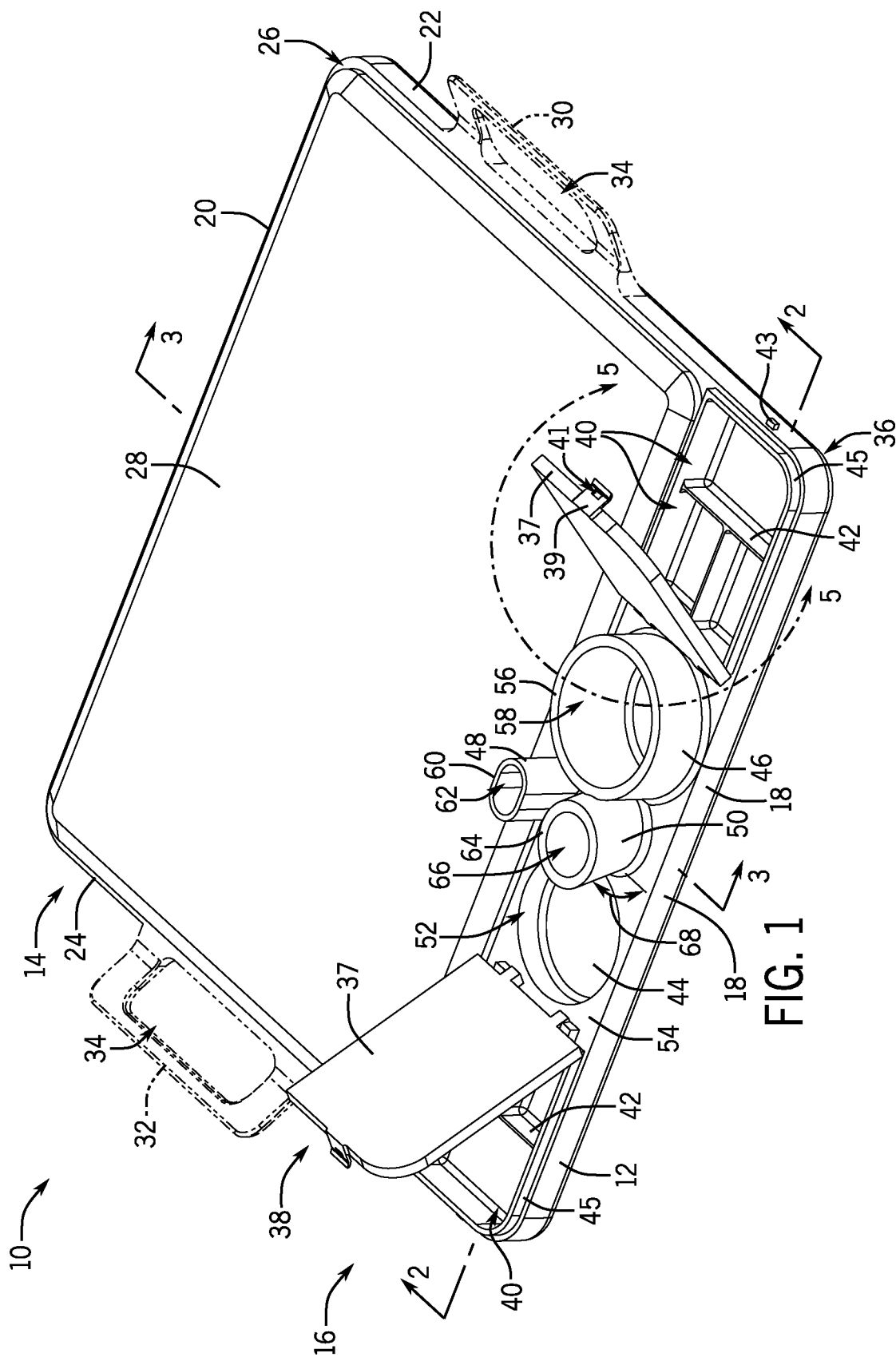
FIG. 1 is a top perspective view of an ice fishing knee board, according to an embodiment of the invention.

Referring to FIG. 1, a front perspective view of an ice fishing knee board 10 is shown, according to an embodiment of the invention. Ice fishing knee board 10 includes a base board or substrate 12 having a kneeling section 14 and an equipment section 16. Base board 12 may be made from a plastic material like polyoxymethylene, polystyrene, polypropylene, and polyethylene, as non-limiting examples. Base board 12 may be formed using a method such as, for example, injection molding, three-dimensional (3D) printing, or thermoforming. Thermoforming could be performed via vacuum, pressure, or mechanical force.

Base board 10 includes a front surface 18 in equipment section 16, a rear surface 20 in kneeling section 14, and left and right side surfaces 22, 24 extending across kneeling and equipment sections 14, 16. Kneeling section 14 includes a recess 26 sized to receive a knee pad 28. Pad 28 will generally be formed of a material that is comfortable to kneel on such as, for example, various types of foam. In some embodiments, pad 28 may be removable from within recess 26 in order to enable ice fishers to more easily wash base board 12. In other embodiments, pad 28 is at least releasably coupled to base board 12 within recess 26. As non-limiting examples, pad 28 may be coupled to base board 12 via adhesive or a releasable fastener such as, for example, a hook and loop fastener.

Kneeling section 14 may also optionally include left and/or right side handles 30, 32 extending from left and right side surfaces 22, 24. Handles 30, 32 may make it easier to carry ice fishing knee board 10. Hand openings 34 in handles 30, 32 will typically be sized such that a hand wearing a glove may fit therethrough since ice fishing knee board 10 is intended for use in temperatures below the freezing point of water. While handles 30, 32 are shown in FIG. 1 as being on left and right side surfaces 22, 24. One or both handles 30, 32 may be positioned in another location on base board 12 such as front surface 18 or rear surface 20, as non-limiting examples.

Equipment section 16 includes a variety different compartments for storing or at least temporarily holding various pieces of ice fishing equipment or supplies. Initially, equipment section 16 includes left and right tackle boxes 36, 38 where front surface 18 of base board 12 meets left and right side surfaces 20, 22 of base board 12, respectively. As shown in FIG. 1, each tackle box 36, 38 includes pockets 40 therein formed by way of a divider 42. In addition, tackle boxes 36, 38 each include a cover 37 including a latch 39 having an opening 41. In FIG. 1, covers 37 are shown in an open position. Tackle box covers 37 may be rotated toward base board 12 into a closed position in which tackle box covers 37 are resting on tackle box cover walls 45 extending from base board 12 and in which openings 41 in latches 39 fit over or around respective lock nipples 43 extending from side surfaces 22, 24 of base board 12 in equipment section 16. In some embodiments, when tackle box covers 37 are in the closed position, tackle boxes 36, 38 are waterproof. As will be described in more detail with respect to FIG. 5, tackle box covers 37 are coupled to base board 12 via walls 45.

In the embodiment shown in FIG. 1, tackle boxes 36, 38 includes three pockets 40 formed by way of a T-shaped divider 42. However, tackle boxes 34, 36 may include more or less pockets 40, and pockets 40 may have different shapes. As a non-limiting example, tackle boxes 36, 38 may include only one pocket 40 without any dividers 42. As another non-limiting example, tackle boxes 36, 38 may include four pockets 40 with divider 42 having an "X" shape. When divider 42 has an "X" shape, divider 42 may be used to create square or rectangular pockets similar to those shown in FIG. 1 or triangular pockets by forming divider 42 with a 45-degree rotation with respect to divider 42 shown in FIG. 1.

Furthermore, tackle boxes 36, 38 are not required to have the same configuration. As a non-limiting example, tackle box 36 could be configured with a single pocket 40, and tackle box 38 could be configured as shown in FIG. 1. The exact configuration of tackle boxes 36, 38 may depend on user preferences. In other words, one ice fisher may prefer to store different equipment/supplies in tackle boxes 36, 38 than another ice fisher and, therefore, may prefer a configuration that is better suited to that equipment/supplies. In any case, tackle boxes 36, 38 can be used to store a variety equipment and supplies such as, for example, hooks, lures, jigs, and bait.

In addition to tackle boxes 36, 38, equipment section 16 of base board 12 includes a bait puck holder 44, a cup holder 46, a tool holder 48, and a fishing rod holder 50 arranged between tackle boxes 36, 38. Bait puck holder 44 includes a recess 52 in a top surface 54 of base board 12 in equipment section 16. Recess 52 is typically sized to receive a standard-size bait puck such as, for example, a wax worm bait puck. Cup holder 46 includes a wall 56 extending substantially perpendicularly from top surface 54 of base board 12 and forming an opening 58. Opening 58 of cup holder 46 is usually a standard-size opening for a cup holder such that cup holder 46 may hold, as non-limiting examples, standard size aluminum cans, plastic, metal, or glass bottles, or disposable plastic cups. However, in various embodiments, bait puck holder 44 and cup holder 46 can be sized to specific containers that are smaller or larger than the standard size containers described above. Further, while bat puck holder 44 is illustrated as having a circular shape in FIG. 1, bait puck holder 44 may be have a different shape such as, for example, square, rectangular, ovular, or any other shape that may be convenient for holding a bait puck therein.

Similar to cup holder 46, tool holder 48 includes a wall 60 extending substantially perpendicularly from top surface 54 of base board 12 and forming an opening 62. In the embodiment shown in FIG. 1, tool holder 48 is sized to receive a needle nose pliers. However, tool holder 48 may be size to receive a different tool that is large or smaller. Depending on what tool holder 48 is designed to hold, equipment section 16 of base board 12 may need to be expanded from what is shown in FIG. 1 to create additional space for a larger tool holder 48. In addition, while tool holder 48 is shown as extending substantially perpendicularly from top surface 54 of base board 12, tool holder 48 may alternatively extend from top surface 54 at an angle—typically, but not necessarily, toward or away from fishing rod holder 50.

Fishing rod holder 50 also includes a wall 64 extending from top surface 54 and forming an opening 66. In the embodiment of FIG. 1, wall 64 extends from top surface 54 toward front surface 18 of base board 12 at an angle 68 that is less than 90 degrees. As s non-limiting example, angle 68 may be 70 degrees. However, in other embodiments, fishing rod holder 50 may extend substantially perpendicularly to top surface 54. Fishing rod holder 50 is typically sized to receive a handle of an ice fishing rod up to a reel of the ice fishing rod. Thus, fishing rod holder 50 can be used by ice fishers to hold their ice fishing rods in between catching fish or even while in the processing of catching fish and bringing the fish through the hole in the ice, depending on the preference of the ice fisher. At the same time, the ice fishers can kneel on pad 28 in kneeling section 14 of base board 12 instead of kneeling directly on the surrounding ice and/or snow. The ability to store their ice fishing rods in fishing rod holder 50, a tool in tool holder 48, a bait puck in bait puck holder 44, and other equipment/supplies in tackle boxes 36, 38 while also kneeling on pad 28 provides both convenience in terms of storage of and access to ice fishing equipment/supplies and comfort to the ice fishers while kneeling on pad 28.

Figure 2:
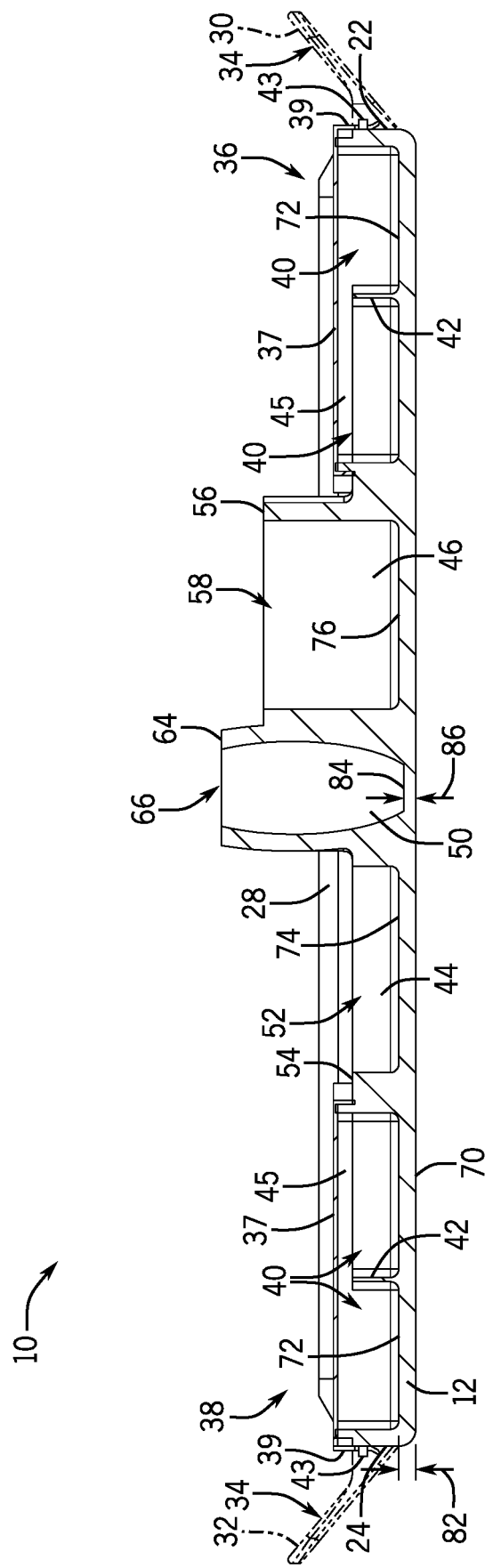
FIG. 2 is a cross-sectional view taken along line 2-2 of FIG. 1, according to an embodiment of the invention.
Figure 3:
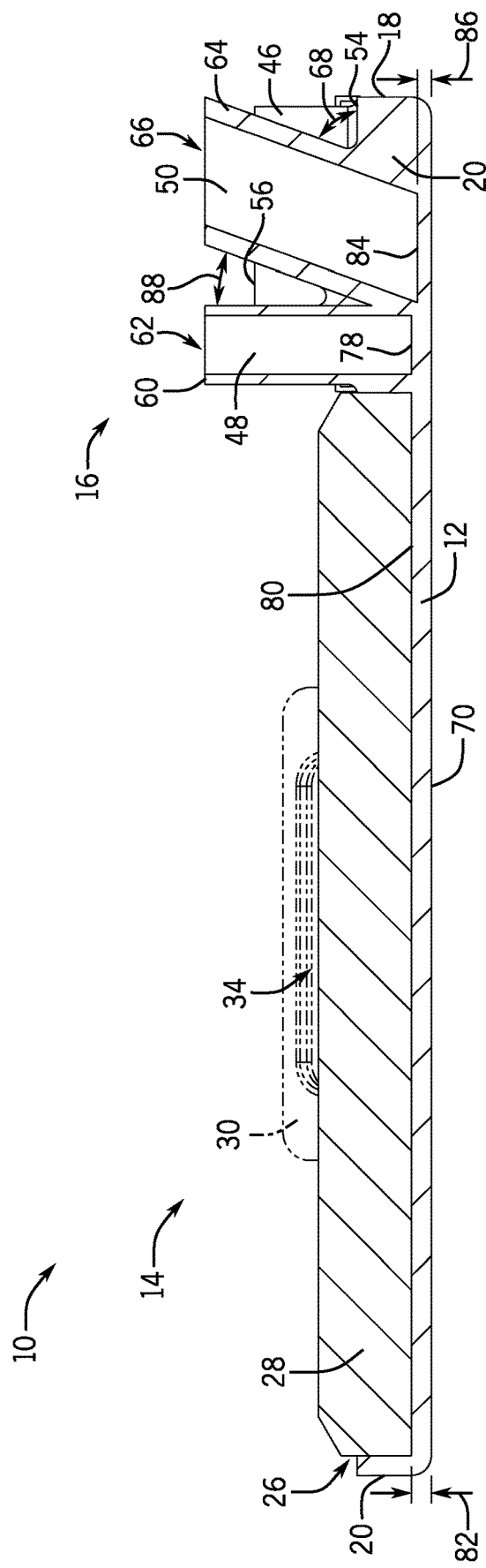
FIG. 3 is a cross-section view taken along line 3-3 of FIG. 1, according to an embodiment of the invention.

Referring now to FIGS. 2 and 3, cross-sectional views of ice fishing knee board 10 of FIG. 1 are shown, according to an embodiment of the invention. FIG. 2 shows a cross-sectional view of ice fishing knee board 10 taken along line 2-2 of FIG. 1. FIG. 3 shows a cross-sectional view of ice fishing knee board 10 taken along line 3-3 of FIG. 1. The cross-sectional view of FIGS. 2 and 3 show how the components of ice fishing knee board 10 are arranged in relation to a bottom surface 70 of base board 12. That is, in relation to FIG. 1, FIGS. 2 and 3 provide a clearer illustration of the depth of the various components. As shown in FIG. 3, bottom surface 70 of ice fishing knee board 10 extends across both kneeling section 14 and equipment section 16 of base board 12.

Initially, FIGS. 2 and 3 show that bottom surfaces 72 of pockets 40 of tackle boxes 36, 38, a bottom surface 74 of recess 52 of bait puck holder 44, a bottom surface 76 of cup holder 46, a bottom surface 78 of tool holder 48, and a bottom surface 80 of recess 26 for pad 28 are substantially aligned and spaced apart from bottom surface 70 of base board 12 by a distance 82. FIGS. 2 and 3 also illustrate that a bottom surface 84 of fishing rod holder 50 is spaced apart from bottom surface 70 of base board 12 by a smaller distance 86. However, distances 82, 86 may be approximately the same in various embodiments.

FIGS. 2 and 3 also illustrate how opening 58 formed by wall 56 of cup holder 46, opening 62 formed by wall 60 of tool holder 48, and opening 66 formed by wall 64 of fishing rod holder 50 provide access to respective bottom surfaces 76, 78, 84 of cup holder 46, tool holder 48, and fishing rod holder 50. As such, walls 56, 60, 64 of cup holder 46, tool holder 48, and fishing rod holder 50 may be considered as forming tubes extending from bottom surfaces 76, 78, 84 of cup holder 46, tool holder 48, and fishing rod holder 50 to openings 58, 62, 66 of cup holder 46, tool holder 48, and fishing rod holder 50. Further, as shown in FIG. 2, walls 56, 64 of cup holder 46 and fishing rod holder 50 are integral with each other where cup holder 46 and fishing rod holder 50 meet. However, in various embodiments, walls 56, 64 of cup holder 46 and fishing rod holder 50 may be completely separate from each other.

In addition, FIG. 3 illustrates that walls 60, 64 of tool holder 48 and fishing rod holder 50 are integral with each other where tool holder 48 and fishing rod holder 50 meet. However, walls 60, 64 of tool holder 48 and fishing rod holder 50 may be separate from each other in other embodiments. FIG. 3 also shows an angle 88 between walls 60, 64 of tool holder 48 and fishing rod holder 50. This is due to fishing rod 50 extending outward from base board 12 at angle 68.

Figure 4:
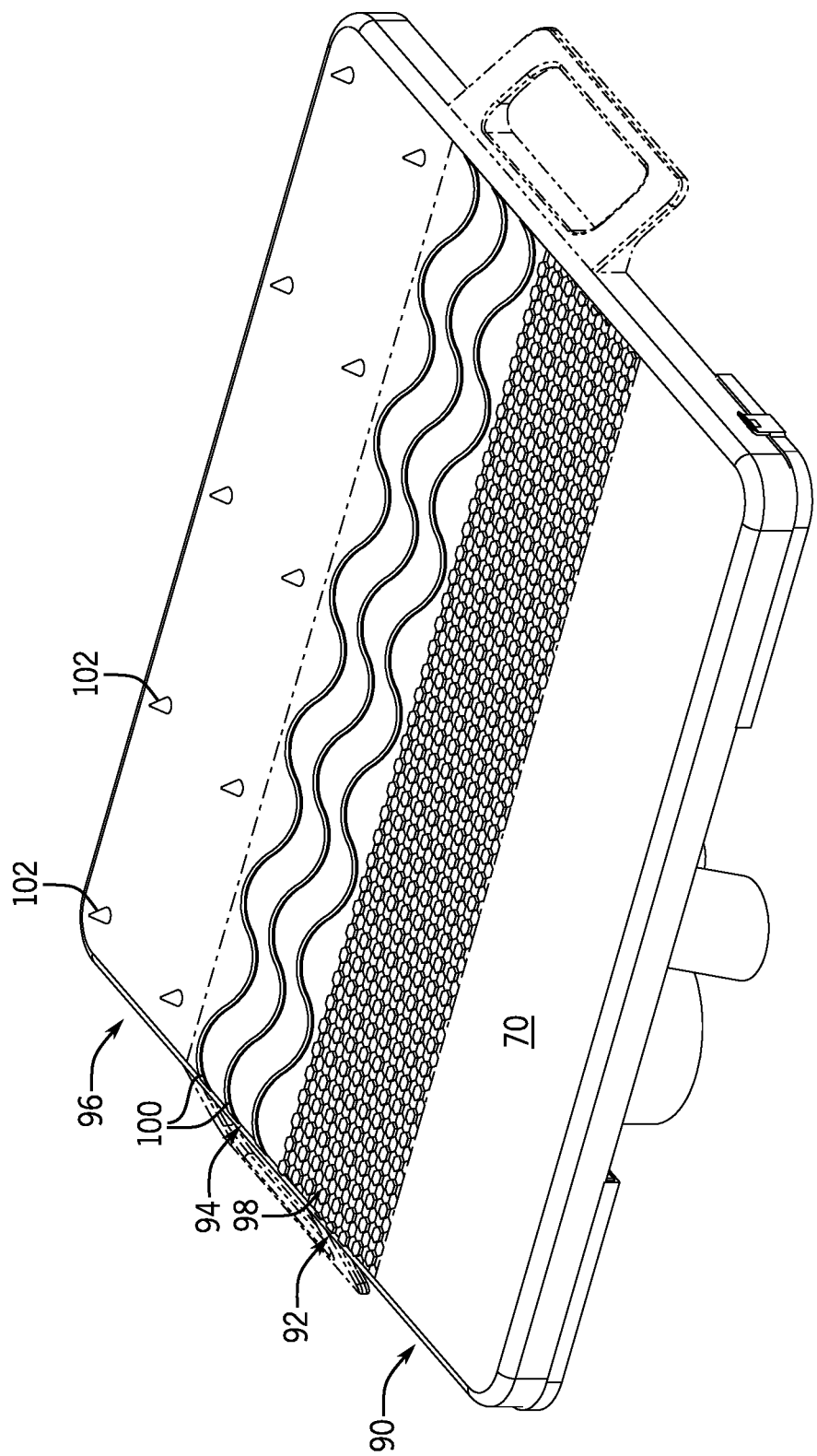
FIG. 4 is a bottom perspective view of the ice fishing knee board of FIG. 1, according to an embodiment of the invention.

Referring now to FIG. 4, a bottom perspective view of ice fishing knee board 10 of FIG. 1 is shown, according to an embodiment of the invention. FIG. 4 illustrates how ice fishing knee board 10 may be substantially flat or include various non-slip surfaces or components on bottom surface 70 of base board 12 that prevent ice fishing knee board 10 from sliding on the ice. That is, FIG. 4 illustrates bottom surface 70 of base board 12 in different optional sections 90, 92, 94, 98 to show different options for bottom surface 70. Optional sections 90, 92, 94, 96 may be used separately to cover the entirely of bottom surface 70 or may be used together. Initially, optional section 90 of bottom surface 70 shows bottom surface 70 as substantially flat. Flat bottom surface 70 will not, by itself, usually provide any non-slip characteristics. However, flat bottom surface 70 may include a non-slip material or be coated with a non-slip spray.

Optional section 92 of bottom surface 70 shows that bottom surface 70 may include a raised hexagonal ridge pattern 98. However, ridge pattern 98 may be shaped in an alternative manner such as, for example, a square, triangular, or circular ridge pattern 98. Further, in some embodiments, rather than being raised with respect to bottom surface 70, ridge pattern 98 may be formed via recesses (not shown) in bottom surface 70 so as not to increase the overall thickness of base board 12. Optional section 94 of bottom surface 70 illustrates how bottom surface 70 may include a plurality of curved ridges 100. However, in various embodiments, ridges 100 may be straight, have a different curvature, or be formed of a plurality of integral straight lines in a pattern such as, for example, a zig-zag pattern. Regardless of the exact configuration of ridge pattern 98 or ridges 100, ridge pattern 98 and ridges 100 would be designed to provide additional grip on the ice and/or snow when ice fishing knee board 10 is in use.

Optional section 96 shows bottom surface 70 with a plurality of spikes 102. Spikes 102 would dig into the ice and/or snow when ice fishing knee board 10 to prevent slippage. The arrangement of spikes 102 illustrated in FIG. 4 is merely an example of how spikes 102 may be arranged. Spikes 102 may be arranged in a different pattern with a different number of spikes 102 and/or may have a different size from that shown.

Figure 5:
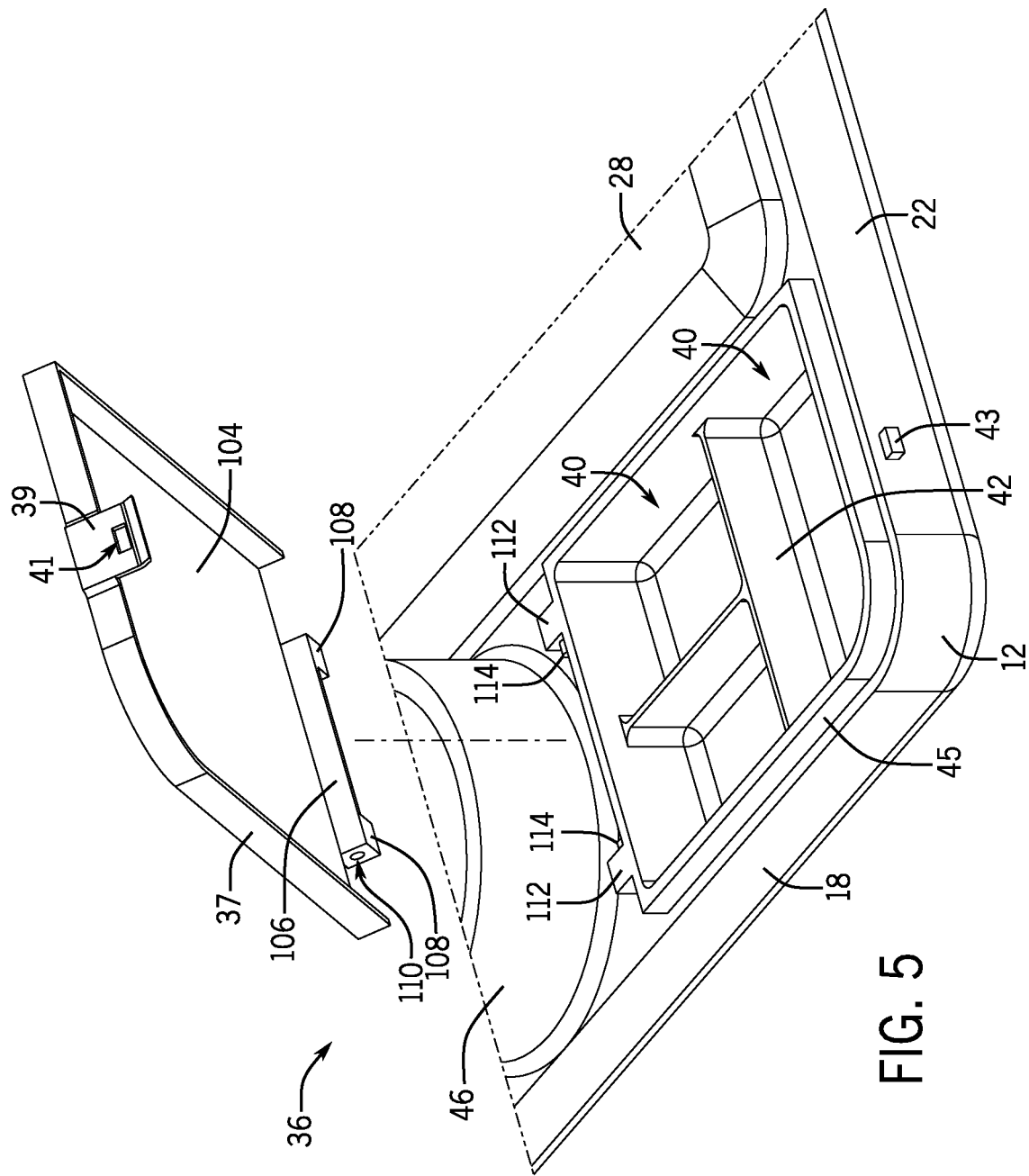
FIG. 5 is an enlarged and exploded version of portion 5 of FIG. 1, according to an embodiment of the invention.

Referring now to FIG. 5, an enlarged and exploded version of portion 5 of FIG. 1 with tackle box 36 is shown, according to an embodiment of the invention. In this view, the structure by which cover 37 of tackle box 36 is coupled to or engaged with base board 12 in equipment section 16 is illustrated. This coupling structure is also applicable to tackle box 38. As shown, tackle box cover 37 includes a front section 104 that covers pockets 40 of tackle box 36 in the closed position and a rear section 106 that coupled to wall 45 of base board 12. Rear section 106 includes a pair of cover extensions 108, each of which includes an opening 110.

Wall 45 of base board 12 includes elements corresponding to those of tackle box cover 37. That is, wall 45 includes a pair of wall extensions 112. Each wall extension 112 includes a pin 114 that corresponds to one of openings 110 of cover extensions 108 of tackle box cover 37. When tackle box cover 37 is coupled to base board 12, rear section 106 of tackle box cover 37 fits between wall extensions 112 of wall 45 of base board 12, with pins 114 being received within openings 110 in cover extensions 108 of cover 37. When pins 114 are received within openings 110, tackle box cover 37 is able to rotate between the open and closed positions. While the arrangement between tackle box cover 37 and base board 12 is shown with pins 114 being located on wall extensions 112 of wall 45 and openings 110 being located in cover extensions 108 of cover 37, pins 114 and openings 110 may be reversed. That is, in some embodiments, cover extensions 108 may include pins 114, and wall extensions 112 may include openings 110.

Beneficially, embodiments of the invention include an ice fishing knee board including a base board having a kneeling section with a knee pad positioned within a recess therein and an equipment section having compartments for various ice fishing equipment. The kneeling section of the base board may optionally have handles extending therefrom for carrying the ice fishing knee board. The equipment section may include at least one tackle box, a fishing rod holder, a tool holder, a cup holder, and/or a bait puck holder. The ice fishing knee board allows ice fishers to kneel comfortably on the ice when ice fishing while keeping their equipment in front of them in a manner that prevents the equipment from being lost or falling into the hole in the ice meant for catching fish. Thus, the ice fishing knee board also enables ice fishers to catch multiple fish more quickly. That is, since their equipment is directly in front of them, they can more easily use their equipment to catch a fish and then set up their fishing rods on the ice fishing knee board in a matter of seconds.

Therefore, according to one embodiment of the invention, an ice fishing knee board includes a base board having an equipment section at a front of the base board and a kneeling section at a rear of the base board and adjacent to the equipment section. The equipment section includes a fishing rod holder sized to receive a fishing rod handle and a first tackle box. In addition, the ice fishing knee board includes a knee pad positioned in the kneeling section of the base board.

According to another embodiment of the present invention, a kit for an ice fishing knee board includes a knee pad and a base board. The base board includes a kneeling section positioned at a rear of the base board and sized to receive the knee pad. The base board also includes an equipment section positioned at a front of the base board and adjacent to the kneeling section. The equipment section includes a fishing rod holder and a tackle box.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. An ice fishing knee board comprising:
    a base board comprising:
        a bottom surface constructed to make direct contact with snow and ice during ice fishing;
        a top surface opposite the bottom surface;
        a front end comprising a front surface connecting the top and bottom surfaces;
        a rear end comprising a rear surface connecting the top and bottom surfaces;
        an equipment section located at the front end of the base board and above the bottom surface of the base board; the equipment section comprising:
            a fishing rod holder sized to receive a fishing rod handle, the fishing rod holder comprising:
                a bottom surface positioned between the top and bottom surfaces of the base board; and
                a tube extending upward from the top surface of the base board and toward the front surface of the base board at an angle less than 90 degrees and providing access to the bottom surface of the fishing rod holder; and
            one or more tackle boxes each comprising a bottom surface positioned above the bottom surface of the base board; and
        a kneeling section located at the rear end of the base board and adjacent to the equipment section; and
    a knee pad positioned in the kneeling section of the base board.

2. The ice fishing knee board of claim 1 wherein the base board further comprises:
    a first side surface connecting the front and rear surfaces of the base board;
    a first handle extending from the first side surface.

3. The ice fishing knee board of claim 2 wherein the base board further comprises:
    a second side surface positioned opposite the first side surface of the base board and connecting the front and rear surfaces of the base board; and
    a second handle extending from the second side surface.

4. The ice fishing knee board of claim 1 wherein;
    the kneeling section of the base board comprises a recess sized to receive the knee pad, the recess comprising a bottom surface positioned between the top and bottom surfaces of the base board; and
    the knee pad is positioned within the recess in the kneeling section of the base board.

5. The ice fishing knee board of claim 1 wherein the one or more tackle boxes comprises first and second tackle boxes.

6. The ice fishing knee board of claim 5 wherein;
    the base board further comprises:
        a first side surface connecting the front and rear surfaces of the base board; and
        a second side surface positioned opposite the first side surface of the base board and connecting the front and rear surfaces of the base board;
    the first tackle box is positioned adjacent the front surface of the base board and between the first side surface and the fishing rod holder; and
    wherein the second tackle box is positioned adjacent the front surface of the base board and between the second side surface and the fishing rod holder.

7. The ice fishing knee board of claim 1 wherein the bottom surface of each tackle box of the one or more tackle boxes is positioned between the top and bottom surfaces of the base board.

8. The ice fishing knee board of claim 1 wherein each tackle box of the one or more tackle boxes comprises at least one divider configured to form a plurality of pockets therein.

9. The ice fishing knee board of claim 1 wherein the equipment section of the base board comprises a tool holder sized to receive jaws of a needle nose pliers.

10. The ice fishing knee board of claim 9 wherein the tool holder comprises:
    a bottom surface positioned between the top and bottom surfaces of the base board; and
    a tube extending upward from the top surface of the base board and providing access to the bottom surface of the tool holder.

11. The ice fishing knee board of claim 1 wherein:
    each tackle box of the one or more tackle boxes comprises a cover movable between an open position and a closed position and comprising a latch, the latch comprising an opening therein;
    the base board comprises, for each tackle box of the one or more tackle boxes, a corresponding tackle box cover wall extending from the top surface thereof and a corresponding lock nipple extending from a side surface thereof in the equipment section; and
    when in the closed position, the cover of each tackle box of the one or more tackle boxes rests on the corresponding tackle box cover wall and the opening of the latch of the cover of each tackle box of the one or more tackle boxes is positioned around the corresponding lock nipple.

12. A kit for an ice fishing knee board, the kit comprising:
a knee pad; and
a base board comprising:
　a bottom surface constructed to make direct contact with snow and ice during ice fishing;
　a top surface opposite the bottom surface;
　a front end comprising a front surface connecting the top and bottom surfaces;
　a rear end comprising a rear surface connecting the top and bottom surfaces;
　a kneeling section positioned at the rear end of the base board and comprising a recess sized to receive the knee pad, the recess comprising a bottom surface positioned between the top and bottom surfaces of the base board; and
　an equipment section positioned at the front end of the base board and adjacent to the kneeling section, the equipment section comprising:
　　a fishing rod holder comprising:
　　　a bottom surface positioned above the bottom surface of the base board; and
　　　a tube extending upward from the top surface of the base board and toward the front surface of the base board at an angle less than 90 degrees and providing access to the bottom surface of the fishing rod holder; and
　　one or more tackle boxes each comprising a bottom surface positioned between the top and bottom surfaces of the base board.

13. The kit of claim 12 further comprising adhesive for attaching the knee pad to the kneeling section of the base board.

14. The kit of claim 12 wherein the equipment section of the base board comprises a tool holder configured to receive jaws of a needle nose pliers.

15. The kit of claim 12 wherein the base board further comprises a first handle extending therefrom.

16. The kit of claim 15 wherein the base board further comprises a second handle extending therefrom.

17. The kit of claim 12 wherein the equipment section of the base board comprises a bait puck holder comprising a recess.

18. The kit of claim 12 wherein the one or more tackle boxes comprises first and second tackle boxes.

19. The kit of claim 18 wherein:
each of the first and second tackle boxes comprises a cover with a latch comprising an opening therein, each cover movable between an open and a closed position;
the equipment section of the base board comprises:
　first and second tackle box cover walls extending from a top surface of the base board; and
　first and second lock nipples extending from respective first and second side surfaces of the base board; and
when the covers of the first and second tackle boxes are in the closed position, the covers of the first and second tackle boxes rest on the first and second tackle box cover walls, respectively, and the latches of the first and second tackle boxes latch onto the first and second lock nipples, respectively.

20. The kit of claim 19 wherein each of the first and second tackle boxes comprises a divider forming a plurality of pockets therein.

\* \* \* \* \*